Jan. 5, 1926. 1,568,197
J. STUMPF
LOCOMOTIVE WITH COMBINED DRIVE
Filed June 29, 1920  4 Sheets-Sheet 2
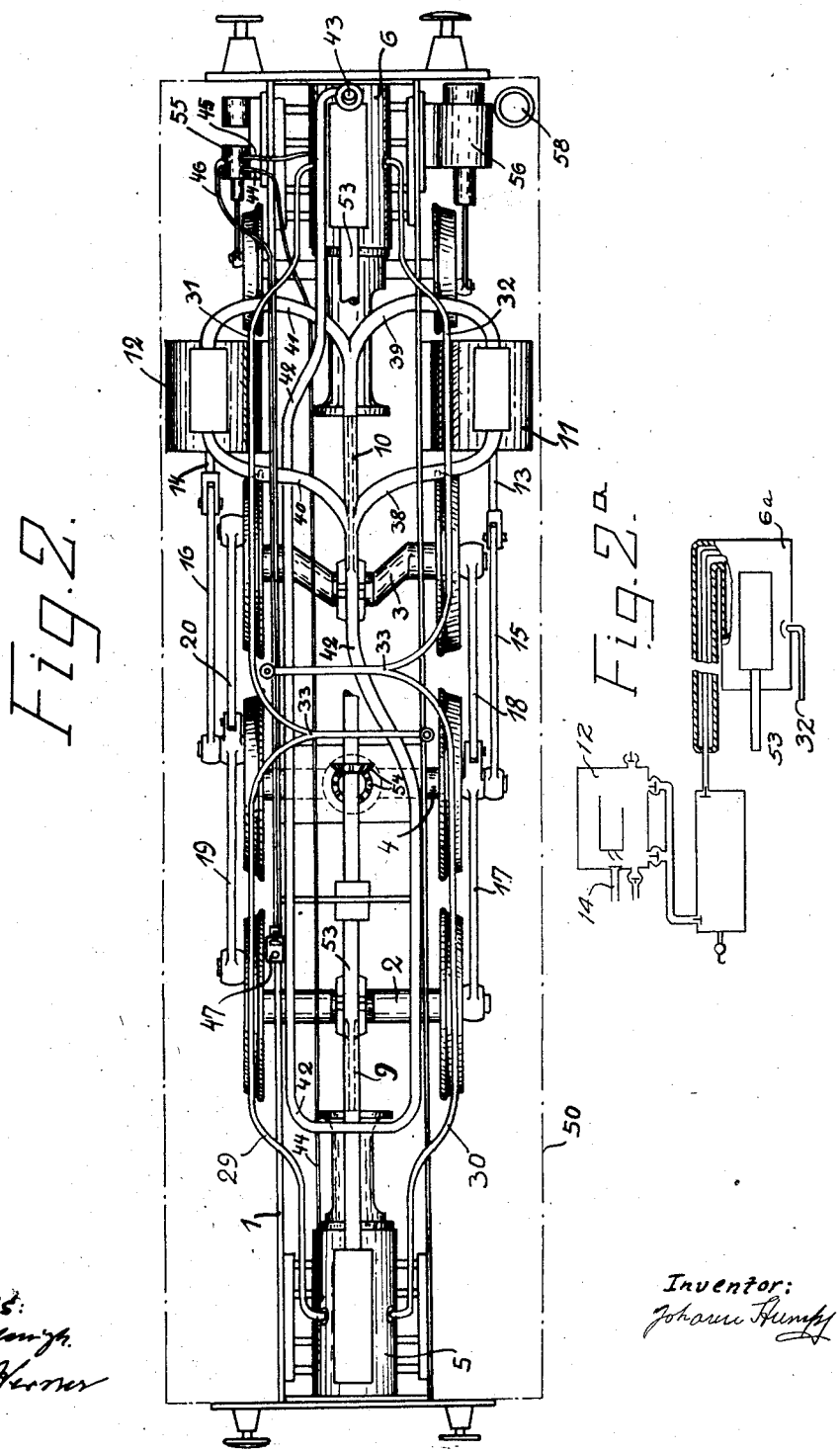
Witnesses:
Inventor:
Johann Stumpf

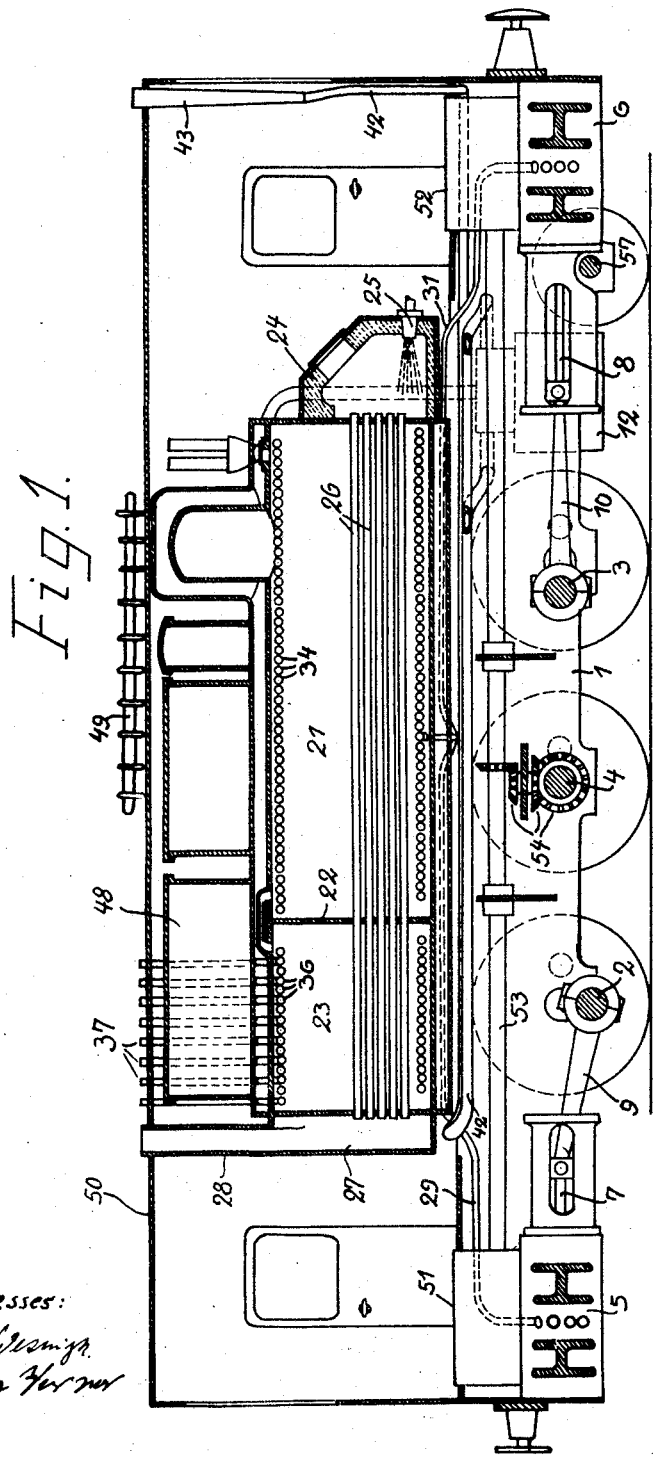

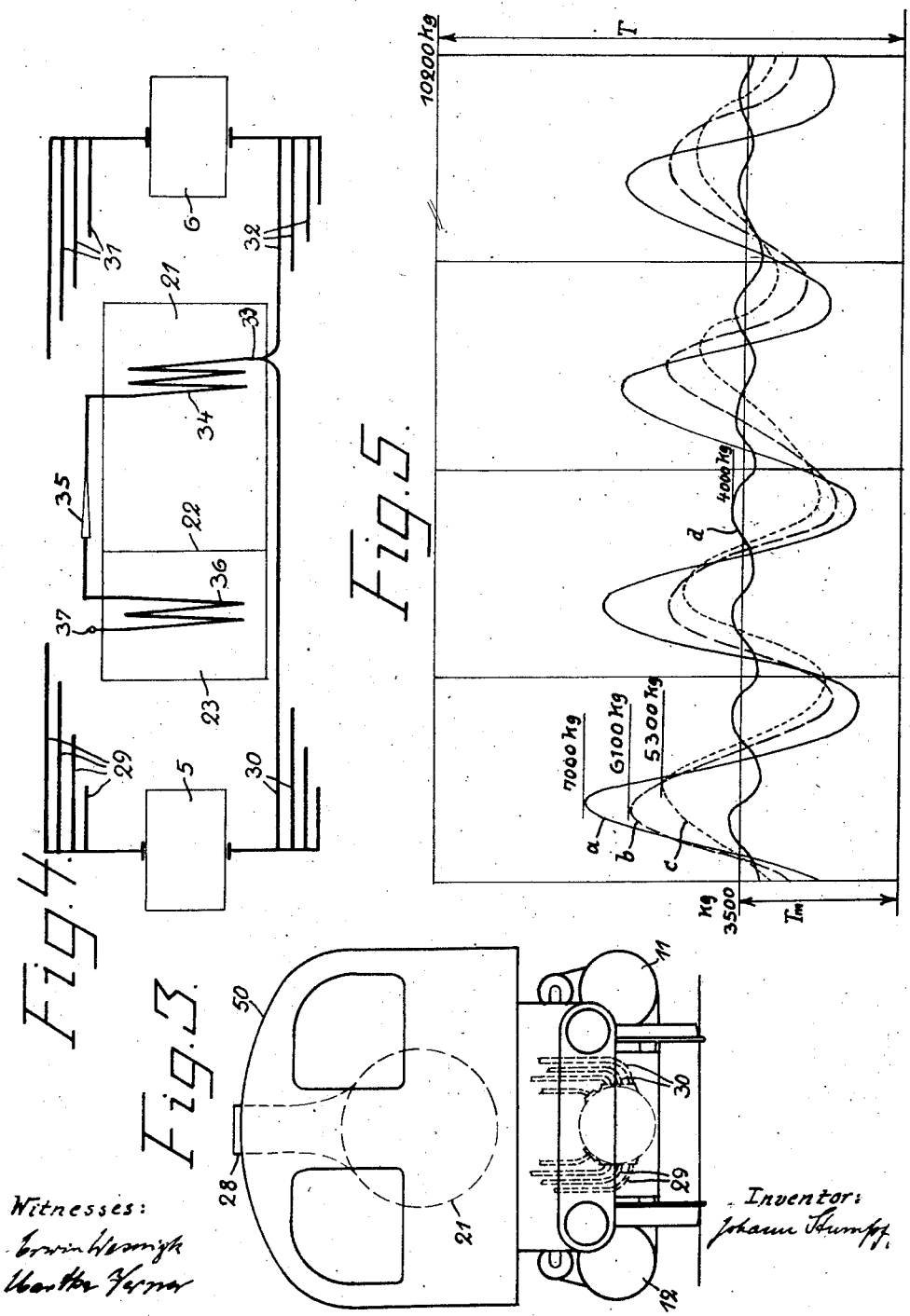

Jan. 5, 1926.  
J. STUMPF  
1,568,197  
LOCOMOTIVE WITH COMBINED DRIVE.  
Filed June 29, 1920    4 Sheets-Sheet 4
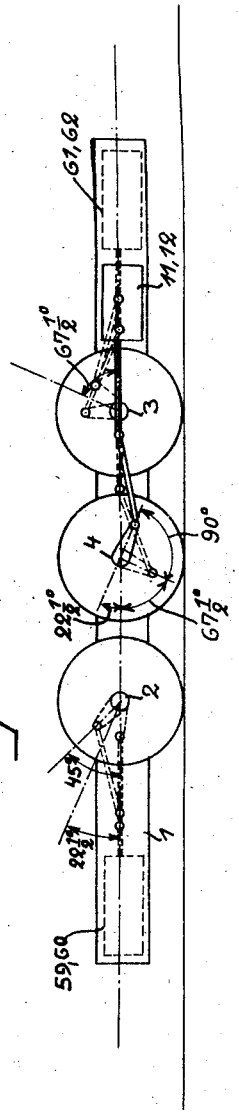
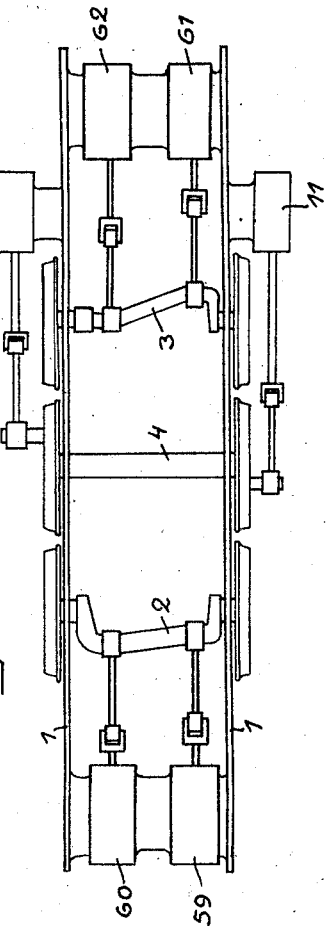
Witnesses:
Inventor:

Patented Jan. 5, 1926.

1,568,197

UNITED STATES PATENT OFFICE.

JOHANN STUMPF, OF BERLIN, GERMANY.

LOCOMOTIVE WITH COMBINED DRIVE.

Application filed June 29, 1920. Serial No. 392,844.

*To all whom it may concern:*

Be it known that I, JOHANN STUMPF, citizen of the Commonwealth of Germany, residing at Berlin, Germany, W. 15, Kurfurstendamm 33, have invented certain new and useful Improvements in Locomotives with Combined Drives, of which the following is a specification.

The invention relates to a locomotive with combined drive by steam and internal combustion engines, the first being used for starting in both directions, the second for constant running. The steam cylinders must be dimensioned so as to be able to start and accelerate the locomotive with the load of the train, and the combustion cylinders must be able to run the train under normal conditions at full speed. The latter engine can therefore be of minor power. This distribution of functions corresponds with the character of the engines, because the steam engine can be easily adapted to develop more power by increasing the degree of admission, whilst the combustion engine can only operate on moderate overloads for short periods and at full speed. Furthermore, the distributing gear of the steam engine can be constructed to work on high degrees of admission without regard to normal load, whilst the gear of the combustion engine needs no further complicated mechanism which would allow it to develop greater powers. As soon as a sufficient number of revolutions is reached the combustion engine starts to work and takes charge of a part of the power needed for acceleration of the train. With the increasing ratio of the power developed by the combustion engines the degree of admission of the steam engines can be reduced, so that finally the combustion engine develops the full needed power and the steam engine runs without load at all. For overcoming light overloads, for example in surmounting short inclines, the combustion engine may be slightly over dimensioned; at greater overloads, that is, in surmounting long inclines with heavy loads, the steam engine can be put to work for a time as an auxiliary engine.

If the locomotive is intended to be run only in one direction, the driving gear of the combustion engine need not be equipped with a reversing gear. In this case the occasional maneuvering at the stations can be done by the steam engine. Only in the case of necessity to run in both directions is a reversing gear for the combustion engine advisable.

By preheating the charge of the combustion cylinders, and attaining thereby sufficiently high ignition temperature, it is possible to have the combustion engine start to work at a comparatively low number of revolutions and to take charge of a part of the power needed, so that the work done, by the thermally less efficient steam engine, may be reduced to a minimum, and eventually the steam engine may be put out of work after a few strokes. The steam consumed by the steam cylinders, with the described system of combined drive, is reduced to such a small quantity, that it can be produced by the waste heat of the combustion engine. For this purpose the exhaust gases of the combustion cylinders are used for steam generating in the boiler, and the hot cooling water of the combustion engine for feeding the same boiler, so that the waste heat from the exhaust gases, as well as from the cooling water, is utilized. The steam generated serves to drive the steam cylinders and eventually also for the heating of the cars. The boiler should be so dimensioned as to make a sufficient part of the adhesion-weight of the driving wheels and also contain a sufficient quantity of water to be able to accumulate most of the waste heat from the combustion engine. The two chief functions of the boiler are therefore the augmenting of the adhesion-weight and the accumulating of the waste heat. For example, Fig. 1 shows the weight of the boiler distributed between the three driving axles.

The exhaust pipes leading from the exhaust ports of the combustion cylinders, pass, after their junction, the shell of the boiler and continue in the inside of the boiler in the form of coils. The coils pass out of the boiler tangentially to the shell of the boiler, turn bow-like and pass into the heater tangentially to the shell of the same. The heater consists in the prolongation of the boiler. The coils can also be placed in special vessels mounted upon the boiler or heater.

The locomotive shown in the drawings has the exhaust ports in the form of nozzles, whereby the rest of the pressure-energy of the gases gets transformed into velocity energy.

The eight exhaust pipes from the eight nozzles of one Diesel cylinder join each to the respective pipes coming from the other cylinder, so that eight pipes pass the boiler and the heater in the described way. The exhaust gas waves, coming from each working cycle of each cylinder, equalize themselves in the long pipes into a continuous gas stream, which creates a suction on the remaining gases, so that a certain vacuum is attained in the cylinders. After the opening of the inlet valves the air charge enters and drives out the rest of the burned gases through the exhaust nozzles. As a result of this mode of operation of the two double acting two stroke cycle Diesel cylinders no air charging pumps are necessary.

The air inlet valves and fuel injection valves are placed in the cylinder covers and are operated from a common cam shaft. The latter is driven from the middle driving axle by beveled wheels, so that it revolves with a number of revolutions double that of the crank shaft. Each second revolution of the cam shaft is made ineffective by a special mechanism.

The two Diesel cylinders are mounted between the two sides of the frame and serve to increase the rigidness of the frame. The Diesel cylinders can be observed through doors in the floor of the locomotive.

The exhaust pipes coming from the boiler have in the turning bow a gradually increasing diameter, before they pass into the heater, so as to form a kind of diffuser; the temperature increases also, and the rest of the waste heat in the exhaust gases is utilized in the heater. The heater is filled with water, which it receives from the cooling mantles of the Diesel cylinders at a temperature of about 100° centigrade. In the heater the temperature of the water is raised to the evaporation temperature of the boiler. In this way the preheated water passes through an upper channel or pipe into the boiler. In the latter the exhaust pipes emerge in the upper part of the boiler out of the water and dry the steam.

For the purpose of generating the first steam to start the locomotive and to render it possible to work with the steam engine in case of emergency, it is necessary to provide the boiler with some additional heating means. As shown in the drawings I have provided a fuel spray nozzle for feeding crude naphtha or tar oil. At one end of the boiler is placed a combustion chamber lined with fire-clay. Into this chamber the oil or tar is forced by a pump or compressed air, or steam. The combustion gases pass from this chamber by the fire tubes, first along the boiler and then along the heater. The proportion of length between the short fire tubes and the long coils of the exhaust pipes is determined by the proportion between the differences of temperature and the hereby given differences in the transmission of heat. The steam cylinders are mounted in the usual way outside the frame and drive the middle driving axle. As the two Diesel engines drive the first and third driving axles, every driving axle is being driven by a separate engine. The cranks of the two outer axles can be constructed reliably enough by bending the axles without disturbing the natural arrangement of the longitudinal fibres of the material.

The cranks of both steam cylinders have an angle of 90° between them, as also the cranks of the two combustion cylinders. Each one of the steam engine pistons runs in opposite direction to one of the combustion cylinder pistons.

By this arrangement a balancing of the to and fro going masses is made possible, so that counterweights become superfluous. The first running axle drives all the auxiliary pumps, as for instance the fuel injection air compressor combined with the brake air pump, the cooling water pump and so forth. It is advisable to mount outside the locomotive cabin a system of cooling tubes for the purpose of cooling the water, which comes from the combustion cylinders and is not used for feeding the boiler. This water can thereby be used again for cooling purposes. Upon the boiler is placed a fuel vessel and a cold water vessel.

The steam cylinders are also fitted with a suction exhaust pipe similar to the combustion cylinders. For this purpose the slide valve is designed to form a nozzle slide valve for an effective transformation of the pressure energy into velocity energy. To maintain the latter all sharp turnings and corners are avoided, and the exhaust-waves following each other are equalized in the long exhaust pipe into a continuous flow, which is led by a diffuser through the roof of the cabin into the atmosphere. Thereby a suction is produced on the steam remaining in the steam cylinders.

An important feature of this locomotive is the elimination of the large irregularity of the turning moment which is usual with Diesel motors without sufficient heavy flywheels, as a result of the high burning pressure and the low pressure at the end of the expansion. This is attained by flattening the maxima of the turning moment diagram by means for preheating the air charge for the Diesel cylinders and therefore diminishing the quantity of the charge. At the same time the inflammability of the charge remains unimpaired as a result of the higher temperature attained. The preheating of the air charge can easily be attained by a heating jacket enveloping the air suction pipe and fed with hot cylinder cooling water, or water from the boiler, or steam.

Effective in the same sense is the increasing of the number of Diesel cylinders, so that every driving axle is driven by two double acting two-stroke cycle cylinders, and the cranks have between them the angles of 45°, so that the positions of the cranks are at the angles of 0°, 45°; 90°, 135°. In this case the turning moment becomes more regular than with two cylinders, and it is possible also to attain more power by the Diesel engines. Besides, the stresses of the crank shaft may be more easily commanded. By this arrangement it is possible to attain nearly full balancing of the moving masses by placing the crank of one steam cylinder at an angle of 180° with the middle line between the two pairs of Diesel cylinder cranks. Therefore, the two middle lines of the two pairs of Diesel cylinder cranks stand opposite to the middle lines of the two steam cylinder cranks, that is, have an angle of 90° between them.

Another important feature of the new locomotive is the reversibility of the Diesel engine, which can be attained in a very simple manner by reversing the cam shaft which is common for all the Diesel cylinders, in regard to the crank axle driving the cam shaft; this reversing can be done by a special reversing apparatus or by a planet differential gear.

The drawings show the new locomotive in two different forms of construction, in which—

Fig. 1 is a longitudinal section of the first form of construction.

Fig. 2 is a plan, the cabin and the boiler being omitted.

Fig. 2a is a diagrammatic view of air connections between the steam cylinder and internal combustion cylinder and air heating means.

Fig. 3 is a front elevation.

Fig. 4 is a scheme of the exhaust pipes serving for boiler heating.

Fig. 5 shows diagrams of the different tangential pressure curves.

Figs. 6 and 7 are a side elevation and a plan of a locomotive with four Diesel cylinders, being the second form of construction.

The machine comprises in its frame 1 two outer cranked driving axles 2 and 3 and one middle axle 4 with an overhung crank. The two outer axles 2 and 3 are driven each by double acting two stroke cycle Diesel cylinders 5 and 6, which are mounted at the outer ends of the machine frame 1 between the frame sides, with their longitudinal axes placed horizontally. The pistons of these Diesel cylinders 5 and 6 drive, by their piston rods 7 and 8 and connecting rods 9 and 10, the cranked driving axles 2 and 3.

Two steam cylinders 11, 12, placed at both sides, outside the frame, drive by their piston rods 13 and 14 and connecting rods 15 and 16, in the usual way, the middle driving axle 4. All the driving axles are coupled by the coupling rods 17, 18, 19 and 20.

The cranks of the two outer driving axles 2 and 3 have an angle of 90° between them, as also have the cranks of the middle driving axle. The masses of the different driving gears are so equalized, and each crank of the outer driving axles 2 and 3 is in such a way oppositely directed to each crank of the middle driving axle, that the moving masses, are usually nearly balanced. The balancing of the masses is nearly perfect, because the Diesel engines are designed to develop a far smaller power than the steam engines, so that the ordinary heavy driving gear of the combustion engines is nearly equalized by the driving gear of the steam engine, which is designed to develop the necessary greater power for starting. The boiler 21, from which the heater 23 is separated by the plate 22, serves for steam generating. This boiler may be used not only for generating the steam needed for driving the steam engine but also for furnishing heating steam for the cars; the heating of the cars not being possible by immediately using the exhaust gases of the internal combustion engine, because of the too high temperature of the said gases. The hot cooling water from the Diesel cylinders 5 and 6 serves for feeding the boiler. The exhaust of the Diesel cylinders serves to heat the boiler; besides there is provided an auxiliary oil or tar injection apparatus.

The auxiliary firing apparatus consists of a chamber 24, with the fuel injection nozzle 25 and all usual necessary mechanism, placed at the front of the boiler. The fire tubes 26 conduct the combustion gases through the boiler 21, as well as through the heater 23, and through the smoke chamber 27 to the chimney 28.

The exhaust ports of the Diesel cylinders 5 and 6 have the shape of nozzles, from which the exhaust pipes extend to the steam generator. All sharp corners and turnings as well as differences in the cross areas of the pipes are avoided. By these means is attained a kind of regular nozzle expansion of the exhaust gases in the exhaust openings, whether they be ports, opened by the piston, or exhaust valves, with the special purpose of giving the gases a high velocity. In the example described there are on each side of each cylinder 5 and 6, four exhaust ports (Figs. 3 and 4) opened by the piston. The ports in cylinder 5 are connected with the respective pipes 29, 30, and these pipes are joined to similar pipes 31 and 32 coming from the second cylinder 6 in pairs, so that two pipes, coming from the two cylinders 5 and 6, are united in the junction 33 to form one pipe with the same direction of the flow of the gases. The united eight pipes are continued in form of coils 34, firstly through the steam generator 21, then are transformed to the form of diffusers 35 and finally pass as coils 36 through the heater 23, after which they discharge the gases through the chimneys 37 into the atmosphere. The smooth curvatures of the pipes, without sharp corners and turnings, allow a high velocity of the gases without much loss.

The gases leaving the cylinders by the nozzles, cause an expansion in the cylinders to below atmospheric pressure; the attained vacuum remains in the whole length of the pipes 29 to 34 and creates a suction on the gases remaining in the cylinder. For discharging the gases into the atmosphere it is necessary to raise the vacuum pressure to that of the atmosphere. The diffuser 35 serves this purpose, in which the velocity energy is again transformed into pressure energy.

The low pressure in the exhaust coils passing the boiler corresponds to a lower temperature of the gases, so that there is no danger of overheating the parts of the coils emerging out of the water. At the same time the emerging parts of the coils dry the steam. The diffusers 35 are placed between the boiler and the heater 23 so as to make the gases pass the heater at atmospheric pressure and therefore with the correspondingly raised temperature. The coil 36 has, in consequence of the smaller gas velocity attained by the diffuser 35, a larger cross area.

The large inner surface of the pipes, the high temperature of the gases and the low temperature of the water in the heater allow an effective heat transmission and effective utilization of the waste heat.

The exhaust pipes can also be placed in special tubes of a large diameter, connected to the boiler or heater in such a way, that the boiler and heater are fired by the auxiliary fuel injection apparatus and the tubes heated by the exhaust. The vacuum attained in the exhaust pipes creates a suction upon the gases remaining in the Diesel cylinders 5 and 6, so that the cylinders are emptied, scavenged and charged with fresh air without any scavenging or charging pumps.

The exhaust of the steam cylinders 11 and 12 is led in a similar way through nozzle shaped openings and pipes 38, 39, 40 and 41, without sharp corners, which pipes are united to a common pipe 42, which runs around the locomotive with the purpose of securing sufficient length for the equalizing of the steam flow and causing a suction on the remaining steam, after which the exhaust steam is led through the diffuser 43 into the atmosphere. The exhaust steam pipe may be advantageously combined with the blast pipe for augmenting the draught in the fire box, but as a rule this is not necessary, because the boiler is ordinarily heated only by the Diesel exhaust and can easily develop the steam pressure needed for starting. The hot cylinder cooling water is fed by the pipes 44, 45, 46 and 47 to the heater 23. The cooling mantles of the cylinders are fed from the fresh water vessel 48, placed on top of the boiler.

For the purpose of making the Diesel engine easy to start by reversing the pump 55, the warm water may be led from the heater 23 through the pipes 44, 45, 46 and 47, into the cooling jackets. For the same purpose the hot water from the steam generator can also be used. For filling up the fresh water vessel a cooler 49 is provided, which, during normal working of the Diesel engine 5 and 6, may be put in the cooling water circuit of the same. The cooler ought to be able to exercise its function also without the fresh water vessel. The cooler is mounted on the outer side of the cabin, enclosing the whole machine. The cabin 50 is so dimensioned, that around the boiler there is enough room available for a gangway. On the floor of the cabin, at each side of the same, are provided doors 51 and 52, through which the Diesel cylinders 5 and 6 and their gear, may be inspected at any time during the run.

For governing the Diesel engines, there is provided a common cam shaft 53 which is driven by a bevel gear 54 from the middle driving axle 4. The cam shaft is driven with a number of revolutions double that of the crank shaft and thereby furnishes very quick opening and shutting movements of the valves, which are driven by eccentrics or cams. Each second revolution of the cam shaft, is superfluous for the command of the valves, and is made ineffective by a special gear of some known type.

The cooling water pumps, the fresh water pumps, the brake air compressor, the fuel injection compressor, and the like are driven by the running axle 57, as shown at 55 and 56. A spare steam driven air compressor 58 is provided and similarly may be provided spare pumps for the other pumps.

For the purpose of making the best use of the adhesion-weight it is necessary that the tangential pressure diagram of the Diesel engines be as flat as possible, because otherwise the driving wheels would slide on the rails. A simple means may be provided for flattening the tangential diagram, comprising any suitable heating device for the fresh air charge of the Diesel cylinders. This can be attained for instance by a simple water jacket $6^a$ about the air suction pipe of the Diesel engines, and connected to the water jacket of the combustion cylinders (see Fig. $2^a$). The previous heating of the air charge enables the Diesel cylinders to be charged with a smaller quantity of air, and consequently the compression and the maximum explosion pressures reach only a smaller degree; thereby the tangential-pressure diagram is flattened and the maxima of the turning moment are diminished. Fig. 5 is a diagram, the line $a$ showing the curve corresponding to a normally working Diesel engine without heating the air charge. Below in this diagram are shown two further curves, $b$ corresponding to a heated air charge, and $c$ to a diminished maximum combustion pressure. The pressure is diminished from 35 at. to 25 at. and to 17 at. respectively; the air charge in this case is heated to 67° and to 97° respectively. In all cases a maximum compression temperature of 650° abs. is sought, this temperature securing a good ignition.

In the tangential pressure diagram Fig. 5, $b$ and $c$ attained in this way allows starting of the Diesel cylinders at a small number of revolutions without the danger, that the combined diagrams of the Diesel engine and the steam engine working at a high degree of admission show at any point a too high tangential force, which would cause sliding of the wheels on the rails. Thereby a great part of the whole starting power may be furnished by the Diesel engines.

The flattening of the tangential diagram curves may also be attained by providing a greater number of Diesel cylinders; for instance in Figs. 6 and 7 is shown in side elevation and in plan an arrangement of two pairs of cylinders. The general arrangement of the machine being the same as aforesaid, at each end of the frame are mounted two cylinders 59 and 60 and 61 and 62. Correspondingly the driving axles 2 and 3 are provided each with two cranks with an angle of 45° between them. The two driving axles 2 and 3 are furthermore so arranged, that the cranks follow each other at angles 0°—45°—90°—135°, or what means the same, that the middle line of the cranks of the one driving axle 2 stands at right angle to the respective middle line of the cranks of the other driving axle 3. The cranks of the steam cylinders 11 and 12 include in their turn an angle of 90° and are directed oppositely to the said middle lines of the cranks of the Diesel engines. In this way the masses working with each steam cylinder balance the masses working with two Diesel cylinders as far as possible.

At this arrangement the maxima of the tangential force curve ($d$, Fig. 5) are not only doubled in number but at the same time reduced according to the smaller power of each Diesel cylinder. In this way it results that even with great Diesel cylinders able to furnish a great summary power a sliding of the wheels on the rails is avoided in consequence of the flat tangential force diagram.

The Diesel cylinders may be served with an augmented air charge and may consequently develop a greater power by using the empty running steam cylinders as loading or charging pumps.

A backward running of the new locomotive for short distances, for instance at maneuvering, may easily be attained by the steam cylinders, which are reversible as commonly known.

For backward running for longer distances, in case that turning round the locomotive is not possible, the Diesel engines may be constructed reversible.

For avoiding too much cooling of the steam cylinders during the empty running and too great consumption of steam at starting it is advisable to heat the steam cylinders by the waste heat of the Diesel cylinders.

Instead of the double acting two-stroke cycle Diesel cylinders there may obviously be provided double acting four-stroke cycle cylinders arranged as required.

It should also be understood that while the claims are all limited to locomotives, it is the intention of applicant to use this term in the broad sense as applying to self-propelled traction devices, usually designated specifically as "locomotives" and as "tractors," in which power must be developed far beyond that necessary merely for their own locomotion.

Having now particularly described and ascertained my said invention, what I claim and desire to secure by Letters Patent of the United States is:

1. The method of operating locomotives with combined steam and internal combustion drive, each medium acting directly upon different drive wheels, in which the waste heat of the internal combustion is utilized in generating the steam, which consists in controlling the respective steam and internal combustion cycles, so that the work of the steam shall be displaced after a few strokes of internal combustion, and the steam consumption confined within such limits that the amount required can be produced by said waste heat of internal combustion.

2. The method of operating locomotives with combined drive of steam and of internal combustion in which the waste heat of the internal combustion is utilized to the fullest possible extent in generating the steam, which consists in utilizing the heat of the hot cooling water to preheat combustible charges to attain high ignition temperatures, to start the internal combustion work at comparatively low speed, so that the work required of the thermally less efficient steam may be reduced and displaced after a few strokes of internal combustion, and the steam consumption reduced to such limits, that the amount required can be produced by said waste heat of the internal combustion.

3. The method of operating locomotives with combined drive of steam and internal combustion, which consists in conducting a plurality of streams of hot exhaust gases from the internal combustion spaces, merging said streams into a common stream, and then leading said common stream to and through the steam generating space, and then to and through a water heating zone, and transforming the velocity-energy of the gases into pressure-energy as the same pass from the steam generating space to the water heating zone.

4. The method of operating locomotives with combined steam and internal combustion drive, which consists in flattening the maximum of the turning moment of the internal combustion diagram by utilizing the hot cooling water in preheating the charge to the combustion space in order to diminish the charge and maintain its combustibility unimpaired.

5. The method of operating locomotives with combined steam and internal combustion drive, which consists in the previous heating of the air charge by the hot cooling water to enable charging with a smaller quantity of air, and thereby reducing the compression and maximum expansion pressures in order to flatten the tangential force diagram and to reduce the maximum turning moment.

6. The method of operating locomotives with combined steam and internal combustion drive, which consists in the previous heating of the air charge by the hot cooling water to enable charging with a smaller quantity of air, and thereby reducing the compression and maximum expansion pressures in order to start the internal combustion engines at a small number of revolutions and thereby prevent a sliding of the wheels on the rails.

7. In a locomotive, the combination with steam cylinders and internal combustion cylinders, pistons, piston rods and cranks in operative relationship therewith, the cranks arranged so that the steam cranks are placed at ninety degrees to each other and the internal combustion cranks are placed at ninety degrees to each other and each steam engine crank is oppositely directed to an internal combustion engine crank.

8. The method of operating locomotives with combined drive by separate steam and internal combustion cylinders, which consists in utilizing steam for starting and internal combustion for constant running, and preheating by the hot cooling water the charge of the combustion cylinders thereby attaining sufficiently high ignition temperature in order that the combustion cylinder shall start to work at a comparatively low number of revolutions.

9. The method of operating locomotives with combined drive by separate steam and internal combustion cylinders, said steam and internal combustion acting directly on different drive wheels which consists in utilizing the coacting forces of steam and internal combustion in said operation, and so arranging the cranks which are connected to the pistons of the several cylinders, the steam cranks with respect to each other, the combustion cranks with respect to each other, and the steam cranks with respect to the combustion cranks, as to secure a balancing of the reciprocating masses.

10. A locomotive having a combined drive comprising separate steam and internal combustion cylinders and controlling means therefor, and means, utilizing hot cooling water, for preheating the charge of the combustion cylinders in order to obtain sufficiently high ignition temperature to enable the combustion cylinder to start to work at a comparatively low number of revolutions.

11. A locomotive having a combined drive comprising separate steam and internal combustion cylinders and controlling means therefor, including cranks of the combustion cylinders positioned relatively at the angles of 0°, 45°, 90° and 135° and the cranks of the steam cylinders so positioned that the two middle lines of the two pairs of combustion cylinder cranks stand opposite to the middle lines of the two steam cylinder cranks, as and for the purpose specified.

12. In locomotives the combination with a starting steam engine of internal combustion engines, the pistons of all said engines acting immediately upon the supporting drive axles of the locomotive, and the axes of all cylinders being parallel to one another, in such a manner, that the moving masses of the pistons and rods are balanced by aid of using two steam engine cranks including an angle of 90° between one another, and two internal combustion engine cranks including also an angle of 90° between one another, every steam engine crank being oppositely directed to one of the other cranks.

13. In locomotives the combination with a starting steam engine and running internal combustion engines of three drive axles, the middle axle being driven by steam cylinders arranged beside the locomotive frame, and the foremost and aftermost axles being driven by internal combustion cylinders arranged between the end parts of the locomotive frame.

14. In locomotives in combination with a starting steam engine and with internal combustion engines, the arrangement of a boiler adapted to contain a great amount of water and, of a device adapted to conduct the hot cooling water of the internal combustion engines to the boiler, and of a heater the water space of which is connected to the hot cooling water conducting device, and the heating gas space of which is connected to the boiler heating device at the end of the latter which is most remote from the firing region.

15. In locomotives in combination with a starting engine and with internal combustion engines acting immediately upon the drive axles of the locomotive, the arrangement of a hot cooling water heater adapted to pre-heat the air flowing to the internal combustion engine cylinders, so as to diminish the maxima of the explosion temperatures and powers.

16. In locomotives in combination with a starting engine and with internal combustion engines acting immediately upon the drive axles of the locomotive, the arrangement of the internal combustion engines as two pairs of Diesel cylinders, each pair acting on a common axle, the cranks of each pair of the said Diesel cylinders including between them an angle of 45°, and the middle lines of the said respective angles including between them an angle of 90°.

17. In locomotives in combination with two steam cylinders and four internal combustion cylinders acting immediately upon the drive axles, the arrangement of the internal combustion engines as two pairs of Diesel cylinders, each pair acting on a common axle, the cranks of each pair of the said Diesel cylinders including between them an angle of 45°, and the cranks of the two steam cylinders being oppositely directed to the middle lines of the said angles of 45° respectively.

18. In locomotives in combination with a starting engine and with internal combustion engines acting immediately upon the drive axles of the locomotive, the arrangement of a common cam shaft governing the valves of the internal combustion engines and connected by driving gear to one drive axle.

19. In locomotives in combination with a starting engine and with internal combustion engines acting immediately upon the drive axles of the locomotive, the arrangement of a common cam shaft governing the valves of the internal combustion engines and connected by a reversible driving gear to one drive axle.

20. A combined internal combustion and steam locomotive comprising in combination a group of at least two internal combustion cylinders mounted substantially horizontally in a common frame, and fluid cylinders, said cylinders driving drive axles through cranks oppositely directed so that the distribution of the centrifugal forces due to said cranks about the radius of gyration of said axle results in a good running balance of said axle.

In testimony whereof I affix my signature.

JOHANN STUMPF.